Figure 1:
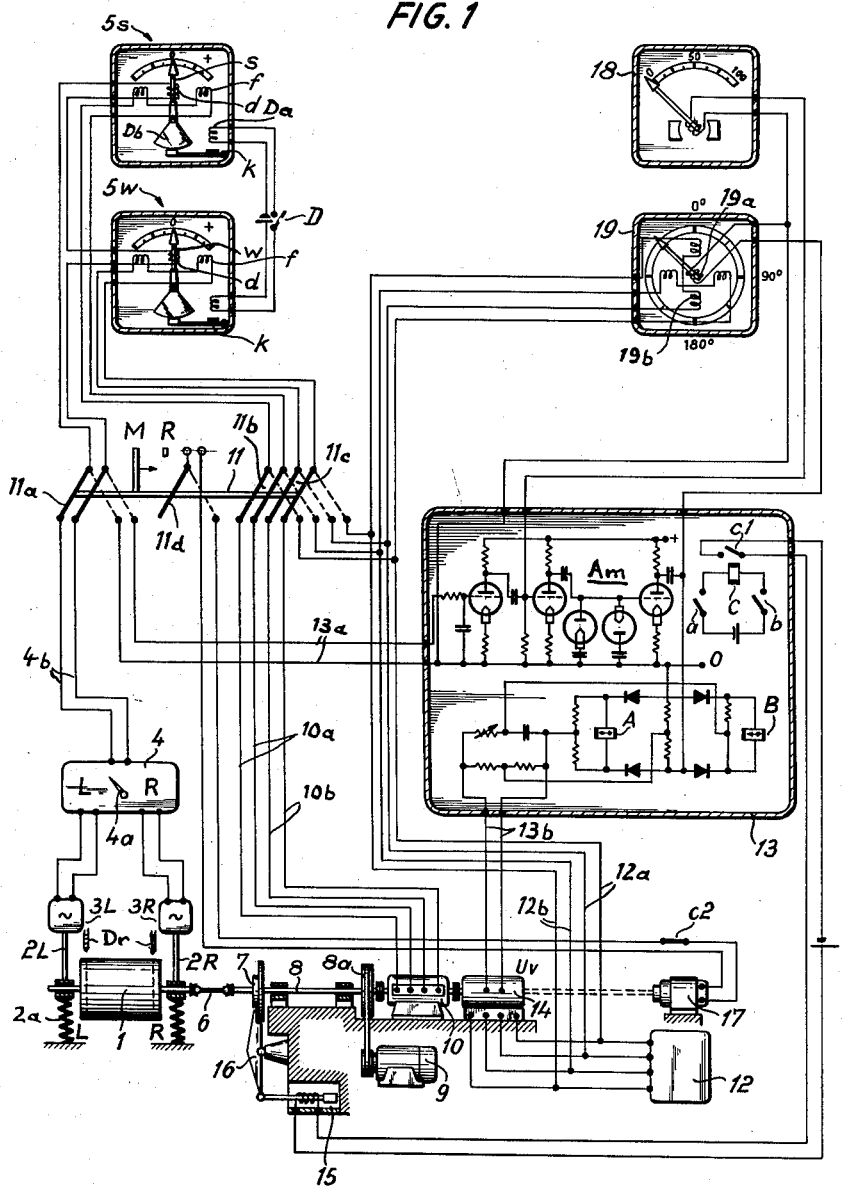

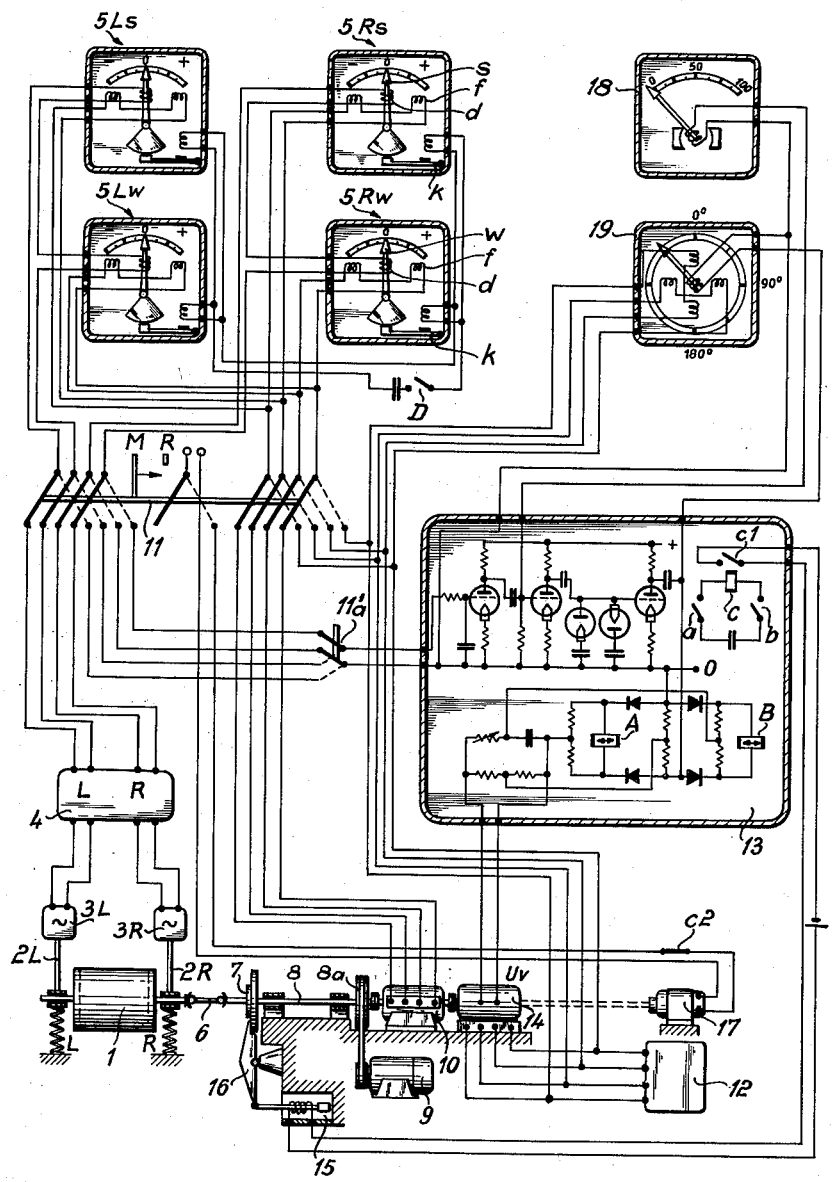

United States Patent Office 2,990,717
Patented July 4, 1961

2,990,717
APPARATUS FOR BALANCING ROTATABLE WORKPIECES
Klaus Federn, Darmstadt, Germany, assignor to Carl Schenck Maschinenfabrik G.m.b.H., Darmstadt, Germany, a corporation of Germany
Filed Sept. 9, 1958, Ser. No. 759,979
Claims priority, application Germany Sept. 14, 1957
8 Claims. (Cl. 73—463)

My invention relates to the balancing of rotatable workpieces by determining balance inherent in the workpiece and thereafter performing a balance correcting operation which adds or removes material in such an amount and at such a location of the workpiece as to eliminate the unbalance.

Such balancing purposes make it necessary, after measuring the unbalance data, to place and arrest the workpiece in the correct angular position in front of the tool, such as a drill, which is to perform the balance correcting operation.

A variety of methods and devices have become known for thus arresting the workpiece in the position required for proper unbalance correction. Some of the known devices operate automatically by catching and locking the workpiece either while the workpiece is coasting from the balance-measuring run down to slow speed, or while the workpiece is being slowly rotated by a special drive. A simpler method does away with such a special drive and requires that the attendant turn the workpiece by hand slowly to the previously measured angular position of its unbalance, whereafter the attendant clamps the workpiece firmly in that position.

All these known methods require that, while the unbalance is being measured and the workpiece is rotating at the proper speed of the measuring run, an angular-position transmitter or an instrument for indicating the angular position of unbalance be adjusted automatically or manually so as to indicate the measured angular position of unbalance. For that reason, the known methods of the above-mentioned kind involve a relatively great expenditure in instrumentalities and require a relatively long measuring period particularly when slight unbalance errors are to be determined.

It is an object of my invention to devise means, generally based upon the above-mentioned operating principle, that eliminates such shortcomings.

To this end my invention takes advantage of the known phenomenon of wattmetric indicating instruments to exhibit an inductive reaction or transformer effect between the fixed field coil and the moving coil of the wattmetric system, and utilizes this phenomenon for obtaining an indication of, or an automatic arresting of the workpiece in, the angular position proper for the correction of the previously determined unbalance. This will be further explained in the following.

In modern balancing machines, the unbalance inherent in a rotating workpiece, manifesting itself by the occurrence of oscillations of the bearing structures in which the workpiece is journalled, is measured by means of wattmetric instruments. For this purpose the unbalance-responsive oscillations are converted into alternating voltages by means of electric pickups located in one or two predetermined reference planes, also called "correction planes," that extend radially with respect to the axis of workpiece rotation. These pickup voltages are applied to the moving coil of the wattmetric system whose fixed field coil is energized by alternating current synchronous with the workpiece rotation. As a result, the moving coil is deflected to a position indicative of an unbalance magnitude to be measured.

For the purpose of my invention, two such wattmetric systems are necessary for each correction plane. The stationary field coils of the two systems are separately excited by respective alternating currents, preferably of sinusoidal wave shape, which are 90° phase displaced from each other and thus may be designated as "sine current" and "cosine current." The moving coils of the respective to instruments are excited by the alternating voltages supplied from the above-mentioned pickup means, which are proportional to the bearing oscillations or dynamic bearing forces relative to the correction plane under observation. As a result, the two moving coils, and the instrument pointers connected therewith, are deflected from the zero position by respective angular amounts corresponding to two unbalance components that are coordinately related to each other with reference to a Cartesian system of rectangular coordinates having a fixed positional relation to the workpiece. These unbalance components can be read off on the respective indicating scales of the wattmetric systems or they may also be combined so as to indicate the unbalance as a single vector. The moving coils can then be locked in the positions thus reached, so that the measuring result remains available after the rotating workpiece is brought to standstill and the field currents are terminated. This terminates the unbalance-measuring operation proper.

As far as described above, the unbalance measuring operation required for the purposes of my invention is substantially similar to known wattmetric methods of determining unbalance. However, after the above-described measuring run is completed, I proceed, in accordance with my invention, to utilize the same two wattmetric systems, as previously employed to analyse the unbalance, for furnishing an electric voltage that is indicative of the correct angular position into which the workpiece must be placed for performing the unbalance correcting operation. For this purpose I now energize the two field coils of the respective wattmetric systems by auxiliary alternating currents. The two currents thus supplied to the field coils may have any desired frequency, provided their frequencies, and preferably also their magnitudes, are equal and the two currents have a phase difference that corresponds to the phase difference of the sine and cosine currents previously passing through the field coils during the measuring run. As mentioned, this phase difference normally is 90°.

Each wattmetric system now operates essentially as a transformer. That is, the auxiliary alternating currents flowing through the field coils induce respective alternating secondary voltages in the angularly deflected and arrested moving coils. The induced secondary voltages in the respective moving coils have the same frequency and are proportional to the amount of arrested deflection. By adding the two induced voltages, a resultant sum voltage is produced whose phase position relative to the auxiliary alternating currents is accurately in accordance with the angular position of the unbalance in the workpiece. This sum voltage, therefore, is available, and is used according to my invention, for exhibiting the required workpiece position or for automatically arresting the workpiece in that position, as will be more fully explained presently.

According to another feature of my invention, a preferred way of thus utilizing the above-mentioned sum voltage is as follows. I connect with the workpiece or with the drive for rotating the workpiece a reference transmitter (stop-angle transmitter) which is likewise excited by the above-mentioned auxiliary alternating currents and generates an alternating reference voltage whose phase position is correlated to the angular position of the workpiece. Hence when the workpiece is being rotated at any speed, the reference transmitter rotating in synchronism with the workpiece will supply an alternating reference voltage whose phase is always in a fixed relation to the angular position of the workpiece. By now supplying the alternating sum voltage and the alternating reference voltage to a phase comparator, such as any known phase-sensing controlling or regulating circuits or relays, the comparator will respond to zero phase difference as soon as the workpiece, during rotation, reaches a position which exactly corresponds to the one required for performing the unbalance correcting operation.

According to another feature of my invention I connect the phase comparator with an arresting device which automatically stops and locks the workpiece as soon as the angular position of the unbalance, represented by the sum of the secondary voltages induced in the wattmetric system, is identical with the angular position of the workpiece represented by the voltage of the reference transmitter. During this operation, the workpiece can be turned slowly by hand until the phase-difference responsive stopping device responds and arrests the workpiece in the proper angular position. However, the above-described comparator device may also be designed as a control circuit which acts upon a servo-motor so that this motor turns the workpiece on the shortest way into the correct angular position, and which then arrests the motor in that position.

For balancing a workpiece with reference to a single correction plane, the above-described invention requires the use of two wattmetric systems. These two systems may constitute two separate wattmetric instruments, each being correlated to one of two coordinate components of the unbalance being measured. However, the two wattmetric systems may also be combined to form a single instrument which indicates the unbalance as a vector, such vector indicators being known from U.S. Patent 2,722,830 of K. Federn and H. Hack, assigned to the assignee of the present invention. For balancing a rotating workpiece in two axially spaced correction planes, a total of four wattmetric systems is required comprising two pairs of coordinately correlated instruments or a total of two vector measuring instruments. In all these cases, however, a single stop-angle transmitter as described above is sufficient in principle.

For balancing a workpiece in two correction planes, the invention requires either the use of a selector switch which causes the workpiece to be first arrested in the angular position of unbalance relative to one plane, and which thereafter causes arresting of the workpiece in the angular position of the unbalance relative to the other plane. Such balancing operation, however, can be simplified by providing two reference (stop-angle) transmitters. In this case the rotating workpiece is at first arrested in the one proper angular position that is first reached by the workpiece, while thereafter the rotor is arrested in the angular position correlated to the unbalance in the other correction plane, after the workpiece is released from the first arrested position by automatic or manual control.

The foregoing and more specific objects, advantages and features of my invention will be more fully apparent from and will be set forth in, the following with reference to the drawings in which:

FIG. 1 illustrates diagrammatically a balancing machine as well as the electric circuit diagram of the associated devices required for performing the method according to the invention, and FIG. 2 illustrates in a similar manner a modified form of balancing equipment according to the invention, the same reference characters being used in both illustrations for corresponding components respectively.

Referring to FIG. 1, the workpiece or rotor 1 to be balanced has its shaft journalled in two bearings 2L and 2R. Two radial reference planes of the rotor, with respect to which the balancing correction is to be performed, are indicated by broken lines and denoted by L (left) and R (right) respectively. The bearings 2L and 2R are mounted on the rigid machine frame structure by means of elastic supports represented by springs such as the one denoted by 2a. Any unbalance inherent in rotor 1 will cause the bearings to vibrate at a frequency corresponding to the speed of rotation imparted to the rotor. The vibrations are sensed by respective electric pickups 3L and 3R which convert these vibrations into respective alternating voltages that are impressed upon a potentiometric compensating device 4 which furnishes an output voltage across its output leads 4b. The oscillatory journalling structures for the rotor 1 are preferably so tuned that they remain in non-critical oscillatory condition up to the normal rotating speed of the rotor obtaining during the measuring run. The pickups 3L and 3R may consist of any suitable electric transducers and are preferably of the amplitude-responsive type if the elastic journalling structures are tuned to low frequency, whereas with a higher tuning the pick-ups consist preferably of pressure-responsive transducers.

The potentiometric compensating device 4 serves to superimpose the two pickup voltages so as to produce therefrom a resultant voltage across output leads 4b which is indicative only of the unbalance with reference to only one of the two correction planes L or R, depending upon whether a manual control member 4a is set to the position "L" or "R." When member 4a is set to position "L" as shown in FIG. 1, the alternating voltage across leads 4b is indicative only of the unbalance conditions in the left correction plane L but is not affected by the unbalance conditions with reference to the plane R.

The potentiometric device 4 is not further described herein because such devices are well known in the art of dynamic balancing of rotors and form a component of many balancing machines available on the market. If desired, however, reference may be had to U.S. Patent 2,243,379 (FIG. 1) where such a potentiometric device is shown and described in detail, or to the explanation of such devices offered in the textbook Dynamics of Machinery by James B. Hartman, McGraw-Hill Book Company Inc., New York, 1956 (pages 148 to 150).

The modified pickup voltage of leads 4b which, as explained, is indicative of the rotor unbalance with respect to the left correction plane L only, is applied through a contact pair 11a of a selector switch 11 to the moving coils d of two wattmetric systems which in the illustrated embodiment are constituted by two separate wattmetric instruments 5s and 5w. Instrument 5s serves to indicate the measured unbalance component in the vertical direction (ordinate) of a system of rectangular coordinates (Cartesian coordinates), and instrument 5w serves to simultaneously indicate the horizontal component (abscissa) of the unbalance in the same system of coordinates. This will be more fully explained hereinafter.

The rotor 1 has its shaft coupled through a Cardanic link or universal-joint shaft 6 with a drive shaft 8 on which a brake disc 7 and a belt sheave 8a are mounted. Shaft 8 is driven at sheave 8a by an endless belt from an electric motor 9. Firmly coupled with drive shaft 8 and hence also with rotor 1 is an auxiliary generator 10 which serves as a phase transmitter. Generator 10 may consist of a dynamoelectric machine and provides two alternating, preferably sinusoidal, currents 90° phase displaced from each other whose frequency is in synchronism with the rotor rotation during the unbalance-measuring run. One of these two currents (sine current) correlated to the above-mentioned vertical direction of the coordinate system is passed by means of leads 10a and a contact pair 11b of selector switch 11 through the stationary field coil f of wattmetric instrument 5s. The other current (cosine current) corresponding to the horizontal direction of the coordinate system passes by means of leads 10b and contact pair 11c of selector switch 11 through the field coil f of instruments 5w.

During the measuring run, that is, when the rotor 1 and the phase transmitter 10 are driven by motor 9 at the proper speed, the instrument 5s, whose field coil f is energized by the sine current from phase transmitter 10, causes the moving coil d and hence the pointer s to deflect an angular amount proportional to the vertical component of the workpiece unbalance with respect to the left correction plane L, while simultaneously the pointer w of instrument 5w, whose field coil is energized by cosine current from phase transmitter 10, is deflected an amount corresponding to the unbalance component in the horizontal direction of the same correction plane L.

After both instruments, during the measuring run, have reached their respective pointer deflections indicative of the respective unbalance components, they are arrested and blocked in that position. This is done either automatically or by actuating a switch D which energizes in each instrument a magnet coil, such as the one denoted by Da, that attracts its armature k and thus forces a brake-shot against a segment Db firmly joined with the pointer. The indications of both instruments 5s and 5w thus remain preserved during the operations described hereinafter.

After the instrument pointers are thus arrested in deflected positions, the drive motor 9 is stopped and the workpiece may be permitted to reach standstill. Also, after the instrument pointers are arrested as described, the selector switch 11 is shifted from position M (measuring) into position R (arresting). As a result, the contact pair 11a of switch 11 disconnects leads 4b from the moving coils d of both instruments 5s and 5w and instead connects these moving coils to one pair of input leads 13a of a phase comparator 13. At the same time, the contact pairs 11b and 11c of switch 11 disconnect the phase transmitter 10 from the stationary field coils f of both wattmetric instruments and connect these coils through leads pairs 12a and 12b with a source 12 of two alternating reference currents which are 90° phase displaced relative to each other and may have any desired but constant frequency. Another contact 11d of switch 11 now connects a source of power current (not shown) through a normally closed relay contact c2 with a servo-motor 17 which is coupled with the drive shaft 8 and serves to automatically turn the rotor 1, preferably at creeping speed, into the angular position at which the automatic stopping and blocking device still to be described is to respond.

The 90° phase-displaced reference currents, passing from auxiliary source 12 through the respective field coils f of the two wattmetric instruments 5s and 5w, induce in the respective deflected and arrested moving coils d two secondary voltages, and these voltages are now applied through switch contacts 11a and leads 13a to one of the two input circuits of the phase comparator 13. The other pair of input leads 13b of comparator 13 is simultaneously excited by the voltage of a stop-angle transmitter 14 which is likewise coupled with the shaft 8 and hence with the rotor 1. The transmitter 14 may consist of an electrodynamic generator whose field excitation is supplied from the auxiliary alternating-current source 12 and whose output voltage across leads 13b has the same frequency as the source 12 and a phase position corresponding to the angular position of the rotor 1. This output voltage ($U_v$) of the transmitter 14 corresponds to the equation $U_v = |U_v| \cdot \sin(\omega t + \rho)$, wherein $\rho$ is the instantaneous angular position of the rotor 1, $t$ denotes time, and $\omega$ denotes the angular frequency of the source.

The phase comparator 13 comprises an electronic amplifier Am of conventional design and operation which receives the vectorial sum of the induced secondary voltages from the moving coils d of instruments 5s and 5w and amplifies this sum voltage without disturbing its phase position.

The comparator 13 is preferably energized from a suitable current supply such as a utility power line. Its amplifier Am also operates to limit the amplitude of the amplified sum voltage so that this voltage amplitude has a constant magnitude.

The amplified sum voltage and the voltage from the stop-angle transmitter 14 are applied to a phase-sensing network of electric resistances and halfwave rectifiers which comprises the coils A and B of two electromagnetic relays. The relays respond and then close their respective normally open contacts $a$ and $b$ when the two input voltages of leads 13a and 13b are in phase with each other. Such response takes place when the angular position of the rotor 1 coincides with the phase position of the sum of the induced secondary voltages of the two wattmetric systems. As soon as, under such in-phase condition, the contacts $a$ and $b$ of respective relays A and B close, they energize the coil C of an electromagnetic contactor which then closes its contact $c_1$ and opens its contact $_2$. Contact $c'$ now deenergizes the servo-motor 17, and contact $c_1$ applies excitation to an electromagnet 15 which actuates a clamping device 16 acting upon the disc 7 on drive shaft 8 thus stopping and arresting the rotor 1 in a position which, subject to proper calibration of the fixed angular position occupied by the housings or stators of generator 10 and transmitter 14, corresponds accurately to the angular position of the measured unbalance. The rotor is now locked in the position required for the correcting tools, such as the drills schematically shown at Dr, to correct the unbalance, it being understood that the automatic positioning of the rotor 1 so far described relates only to the correction in the left plane L.

According to a further feature of my invention, the above-described apparatus for utilizing the variable transformer effect in two wattmetric systems to provide a sum voltage indicative of the vectorial unbalance in a given reference plane, is further improved by applying the sum voltage to a measuring or indicating instrument responsive to the magnitude of that sum voltage. The latter instrument, shown at 18 in FIG. 1, then indicates the absolute magnitude of the unbalance in the particular correction plane without being affected by any spurious oscillations of frequencies other than those of the unbalance-responsive oscillations proper. This insensitivity of the instrument is due to the preceding multiplying performance that takes places in the wattmetric system and is responsive only to currents and voltages of the unbalance-responsive vibration frequency but not to any spurious voltages of different frequency. While in apparatus heretofore known for indicating the unbalance magnitude by means of deflecting-pointer instruments the indication is influenced and hence may be falsified by spurious oscillations, particularly by certain disturbing oscillations such as those corresponding to odd harmonics, the invention permits the indication of unbalance magnitude, by means of a pointer instrument, that is formed in accordance with the laws of harmonic analysis and hence is inherently free of spurious oscillatory effects, thus doing away with the necessity of adding frequency-dependent filters and the undesired side effects caused thereby.

The above-mentioned indicating instrument 18, such as a milliampere meter, is supplied merely with the sum of all voltages induced in the moving coils of the wattmetric systems 5s and 5w, preferably through an amplifier, the amplitude of this sum voltage being proportional to the magnitude of the measured unbalance. Accordingly, the instrument 18 is shown connected with one of the first amplifying stages of the amplifier Am. Since the current supplied to instrument 18 is produced by the wattmetric systems, the indication of the unbalance magnitude is independent of any spurious frequencies because a wattmetric system responds only to field-coil currents and moving-coil voltages that have the same frequencies and are in phase with each other. Thus the operation of the indicating instrument 18 takes advantage of the inherent filtering effect of the wattmetric systems.

According to still another feature of my invention, the above-described apparatus for utilizing the transformer effect in wattmetric systems for providing an induced sum voltage indicative of the vectorial unbalance in a given correction plane, is further improved by applying the sum voltage to a phase-responsive measuring or indicating instrument whose deflection thus corresponds to the phase angle of the induced sum voltage. In this manner, the angular position of unbalance for one or more reference planes can be exhibited on deflecting-pointer instruments, as shown at 19 in FIG. 1, whose scale is subdivided from zero to 360 degrees.

The indicating device 19, connected with the comparator 13, for exhibiting the angular position of the measured unbalance may be designed, as shown, in accordance with known receivers in remote transmission systems or power-factor (cos $\varphi$) measuring devices. Accordingly, it has a moving coil 19a excited by amplified current from the amplifier Am of phase comparator 13 and a stationary field system of coils 19b which are excited by the abovementioned alternating currents from auxiliary source 12. Current source 12 may be constituted by a converter, such as a motor-generator, driven from a utility line.

By thus providing for each reference plane a total of two wattmetric systems plus two indicating instruments, the unbalance of the workpiece can be visually exhibited either with respect to its components in a rectangular system of coordinates, or as to its magnitude and angular position. Heretofore this possibility of indicating unbalance by rectangularly correlated components or as to amount and direction was afforded only by using a vector measuring apparatus with an indicating light spot and exchangeable indicating scales, or indirectly by providing such apparatus with additional polar diagram scales having two systems of coordinates.

While in the foregoing the apparatus shown in FIG. 1 is described with reference to the measuring of unbalance components in only one correction plane, namely the left plane L of rotor 1, the same apparatus is also suitable for consecutively measuring the unbalance in two correction planes. For measuring the unbalance in the other correction plane R and then arresting the rotor in the accurate angular position of the unbalance relative to that correction plane, it is merely necessary to set the member 4a of the potentiometric compensating device 4 to the position "R." Then the resultant pickup voltage across leads 4b is indicative only of the unbalance with reference to the plane R, while in all other respects the operation proceeds in the same manner as described above.

For some purposes, however, it is desirable to measure the unbalance simultaneously with reference to both correction planes. This can be done by correcting the compensating device 4 with a total of four watt metric systems as is exemplified by the embodiment illustrated in FIG. 2.

In FIG. 2 the four wattmetric systems are represented by four separate instruments 5Ls, 5Lw, 5Rs, 5Rw. The design and operation of the apparatus is generally in accordance with the foregoing description of FIG. 1 with the exception of the following features.

Connected between the switch 11 and the phase comparator 13 is another selector switch 11a' which, in one position, connects the induced secondary voltages of instruments 5Ls and 5Lw to the comparator 13 and in the other position connects the secondary voltages of instruments 5Rs and 5Rw to the comparator. The rotor 1 is automatically arrested either in the angular position of unbalance of plane L, or of plane R depending upon the selected position of switch 11a'.

Although in FIGS. 1 and 2 only one indicating instrument 18 and one instrument 19 is shown, each can be duplicated, one pair being provided for each of the two correction planes L and R of the workpiece.

Referring to unbalance vector measuring apparatus of the type mentioned above and more fully disclosed in Patent 2,722,830, it is a particular advantage of the present invention that it makes it possible for the first time to use such vector measuring apparatus in conjunction with devices for automatically stopping and arresting the workpiece in the proper angular position of unbalance, without requiring the indication, such as the illuminated spot of the polar-coordinate scale of the vector indicator, to be located by optical auxiliary means before it can be transmitted to the arresting equipment.

It will be obvious to those skilled in the art upon study of this disclosure, that such and various other modifications are readily applicable and hence that the invention may be embodied in apparatus other than those particularly illustrated and described herein, without departing from the essential features of my invention and within the scope of the claims annexed hereto.

I claim:

1. Apparatus for balancing rotors having means for rotating the rotor about its axis, wattmetric measuring means responsive to unbalance-dependent oscillations of the rotor in at least one given radial correction plane and comprising for each correction plane a pair of wattmetric systems each having a fixed coil and a moving coil for deflection of each moving coil to an extent representing a different one of two coordinate rotor-unbalance components in a given system of Cartesian coordinates, in combination with retaining means for arresting said moving coils in the respective deflected positions upon completion of the measuring operation, an auxiliary source of two alternating reference currents of the same frequency but phase displaced from each other in accordance with the angle between said Cartesian coordinates, switch means connecting said auxiliary current source with said respective fixed coils for passing one of said two currents through one of said fixed coils and the other of said currents through the other fixed coil whereby respective secondary voltages are induced in said arrested moving coils, a stop-angle transmitter connected with said rotating means and having an alternating signal voltage of the same frequency as said reference currents and a given phase relation to the rotary position of the rotor, a phase comparator having two input circuits, said two arrested moving coils being connected in series relation to each other and through said switch means with one of said two input circuits whereby a voltage corresponding to the vectorial sum of said two secondary voltages is applied to said one input circuit, said other input circuit being connected to said stop-angle transmitter to be impressed by said signal voltage, said comparator having output means responsive to occurrence of phase coincidence of said respective voltages in said two input circuits, whereby said output means respond when said rotor, while being turned, reaches a position indicative of the angular position of its unbalance relative to said one correction plane.

2. In rotor balancing apparatus according to claim 1, said stop-angle transmitter being electrically connected with said auxiliary source to be excited by said reference currents, whereby the frequency of said signal voltage is the same as that of said sum voltage.

3. Rotor balancing apparatus according to claim 1, comprising normally inactive stop means for arresting the rotor in proper position for unbalance correction, said output means of said comparator being connected with said stop means for actuating the latter in response to said occurrence of phase coincidence.

4. In rotor balancing apparatus according to claim 1, said comparator output means comprising normally open contactor means, a stop mechanism engageable with said rotating means for arresting the rotor in position for unbalance correction, and an electric control circuit connected with said stop mechanism through said contactor means, whereby said contactor means causes said mechanism to stop the rotor when said comparator responds to said phase coincidence.

5. Rotor balancing apparatus according to claim 1, comprising a servo-motor mechanically connected with said rotating means for turning the rotor, a motor control circuit electrically connected with said servo-motor for energizing the latter, a control contact forming part of said switch means and connected with said control circuit for energizing said servo-motor when said switch means are set to connect said auxiliary current source with said fixed coils, and another control contact forming part of said comparator output means and being connected with said control circuit for deenergizing said servo-motor upon response of said comparator to occurrence of said phase coincidence.

6. In balancing apparatus according to claim 1, said wattmetric measuring means comprising pickup means responsive to unbalance-dependent rotor oscillations and a phase reference transmitter connected with said rotating means to be driven thereby, said transmitter having two output circuits for providing respective alternating currents synchronous with the rotor rotation and 90° phase displaced from each other, the phase angle between said two reference currents of said auxiliary source being likewise 90°, said switch means having two selective positions and connecting, only when in a first one of said positions, said pickup means to said two moving coils and simultaneously said two transmitter output circuits with said respective two fixed coils, and said switch, when in its second position, connecting said two moving coils serially with said one input circuit of said comparator and simultaneously connecting said fixed coils with said auxiliary reference-current source.

7. Apparatus for balancing rotors having means for rotating the rotor about its axis, wattmetric measuring means responsive to unbalance-dependent oscillations of the rotor in at least one given radial correction plane and comprising for each correction plane a pair of wattmetric systems each having a fixed coil and a moving coil for deflection of each moving coil to an extent representing a different one of two coordinate rotor-unbalance components in a given system of Cartesian coordinates, in combination with retaining means for arresting said moving coils in the respective deflected positions upon completion of the measuring operation, an auxiliary source of two alternating reference currents of the same frequency but phase displaced from each other in accordance with the angle between said Cartesian coordinates, switch means connecting said auxiliary current source with said respective fixed coils for passing one of said two currents through one of said fixed coils and the other of said currents through the other fixed coil whereby respective secondary voltages are induced in said arrested moving coils, electric circuit means connected through said switch means to both said arrested moving coils to additively receive said two secondary voltages whereby a resultant vectorial sum voltage is formed, and a phase-responsive device connected to said circuit means to receive said sum voltage, a phase reference circuit connected to said phase-responsive device and having a phase-reference voltage of the same frequency as said auxiliary source and a phase related to the rotary position of the rotor, said phase-responsive device having movable means operable in dependence upon the phase condition of said sum voltage relative to said phase-reference voltage, whereby the operation of said movable means is indicative of the angular position of the measured unbalance relative to the rotor.

8. Apparatus for balancing rotors having means for rotating the rotor about its axis, wattmetric measuring means responsive to unbalance-dependent oscillations of the rotor in at least one given radial correction plane and comprising for each correction plane a pair of wattmetric systems each having a fixed coil and a moving coil for deflection of each moving coil to an extent representing a different one of two coordinate rotor-unbalance components in a given system of Cartesian coordinates, in combination with retaining means for arresting said moving coils in the respective deflected positions upon completion of the measuring operation, an auxiliary source of two alternating reference currents of the same frequency but phase displaced from each other in accordance with the angle between said Cartesian coordinates, switch means connecting said auxiliary current source with said respective fixed coils for passing one of said two currents through one of said fixed coils and the other of said currents through the other fixed coil whereby respective secondary voltages are induced in said arrested moving coils, electric circuit means comprising said two arrested moving coils in series with each other so as to be energized by said two secondary voltages whereby a resultant sum voltage is formed, an amplitude measuring device connected to said circuit means for indicating the amplitude of said sum voltage as indicative of the magnitude of the measured rotor unbalance relative to said one correction plane, a phase-responsive measuring device having two input circuits of which one has a phase-reference voltage of the same frequency as said auxiliary source and a phase related to the rotary position of the rotor, said other input circuit being connected to said circuit means to be controlled by said sum voltage whereby said phase-responsive measuring device indicates the phase of said sum voltage as indicative of the angular position of said measured rotor unbalance.

References Cited in the file of this patent

UNITED STATES PATENTS

| | | |
|---|---|---|
| 2,722,830 | Federn et al. | Nov. 8, 1955 |
| 2,783,649 | Hope | Mar. 5, 1957 |
| 2,787,907 | King | Apr. 9, 1957 |
| 2,933,984 | Hack | Apr. 26, 1960 |
| 2,947,175 | King et al. | Aug. 2, 1960 |

FOREIGN PATENTS

| | | |
|---|---|---|
| 843,314 | Germany | July 7, 1952 |